United States Patent
Zhang et al.

(10) Patent No.: US 8,781,234 B2
(45) Date of Patent: Jul. 15, 2014

(54) OPTIMIZED FAST HESSIAN MATRIX COMPUTATION ARCHITECTURE

(75) Inventors: Yong Zhang, Hillsboro, OR (US); Ravishankar Iyer, Portland, OR (US); Rameshkumar G. Illikkal, Portland, OR (US); Donald K. Newell, Portland, OR (US); Jianping Zhou, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 12/896,077

(22) Filed: Oct. 1, 2010

(65) Prior Publication Data

US 2012/0082387 A1 Apr. 5, 2012

(51) Int. Cl.
*G06K 9/50* (2006.01)
*G06K 9/46* (2006.01)
*G06K 9/62* (2006.01)
*G06K 9/66* (2006.01)

(52) U.S. Cl.
USPC ........... 382/201; 382/202; 382/203; 382/209; 382/194; 382/195

(58) Field of Classification Search
USPC ..................... 382/201, 194–195, 219, 260
See application file for complete search history.

(56) References Cited

U.S. PATENT DOCUMENTS 6,647,150 B2 * 11/2003 van der Wal ................. 382/260
2009/0238460 A1 * 9/2009 Funayama et al. ............ 382/181

OTHER PUBLICATIONS

Heymann et al. "SIFT Implementation and Optimization for General-Purpose GPU" Proceedings of the international conference in Central Europe on computer graphics, visualization and computer vision, Jan. 2007, pp. 1-6.*

Bay et al., "SURF: Speeded Up Robust Features", ECCV, 2006, pp. 404-417.

Lee et al., "Accelerating Mobile Augmented Reality on a Handheld Platform", IEEE International Conference on Computer Design, 2009, pp. 419-426.

* cited by examiner

*Primary Examiner* — Matthew Bella
*Assistant Examiner* — Weiwen Yang
(74) *Attorney, Agent, or Firm* — Jordan IP Law, LLC

(57) ABSTRACT

Methods and systems of recognizing images may include an apparatus having a hardware module with logic to, for a plurality of vectors in an image, determine a first intermediate computation based on even pixels of an image vector, and determine a second intermediate computation based on odd pixels of an image vector. The logic can also combine the first and second intermediate computations into a Hessian matrix computation.

19 Claims, 5 Drawing Sheets

US 8,781,234 B2

OPTIMIZED FAST HESSIAN MATRIX COMPUTATION ARCHITECTURE

BACKGROUND

Mobile Augmented Reality (MAR) is an emerging mobile Internet device (MID) application that may provide for recognition of images in real time. Conventional approaches to accomplishing the recognition might involve the use of a software-based Speeded Up Robust Features (SURF) technique to identify and characterize points of interest in a query image, and match processing to compare those points of interest to the points of interest of known images. While these approaches may be suitable in certain circumstances, there still remains considerable room for improvement. For example, traditional software-based solutions to identifying points of interest may be associated with inadequate performance and relatively high power consumption, particularly as MID form factors become smaller.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for an apparatus including a hardware module having logic to, for a plurality of vectors in an image, determine a first intermediate computation based on even pixels of an image vector, and determine a second intermediate computation based on odd pixels of the image vector. The logic can also combine the first and second intermediate computations into a Hessian matrix computation.

Embodiments can also include a system having an image capture module to capture a first image, and a hardware module with logic to, for a plurality of vectors in the first image, determine a first intermediate computation based on even pixels of an image vector, and determine a second intermediate computation based on odd pixels of the image vector. The logic can also combine the first and second intermediate computations into a Hessian matrix computation. In addition, the system may include a match determination module to match the first image to a second image based at least in part on the Hessian matrix computation.

Other embodiments may include a method in which a first intermediate computation is determined based on even pixels of an image vector associated with a first image, and the first intermediate computation is stored to a first accumulation buffer. A second intermediate computation can be determined based on odd pixels of the image vector, wherein the second intermediate computation may be stored to a second accumulation buffer. The method can also involve combining the first and second intermediate computations into a Hessian matrix computation, wherein the first and second intermediate computations are determined in parallel, and the Hessian matrix computation is determined for a plurality of interest points in parallel. In addition, the method may provide for matching the first image to a second image based at least in part on the Hessian matrix computations.

Figure 1:
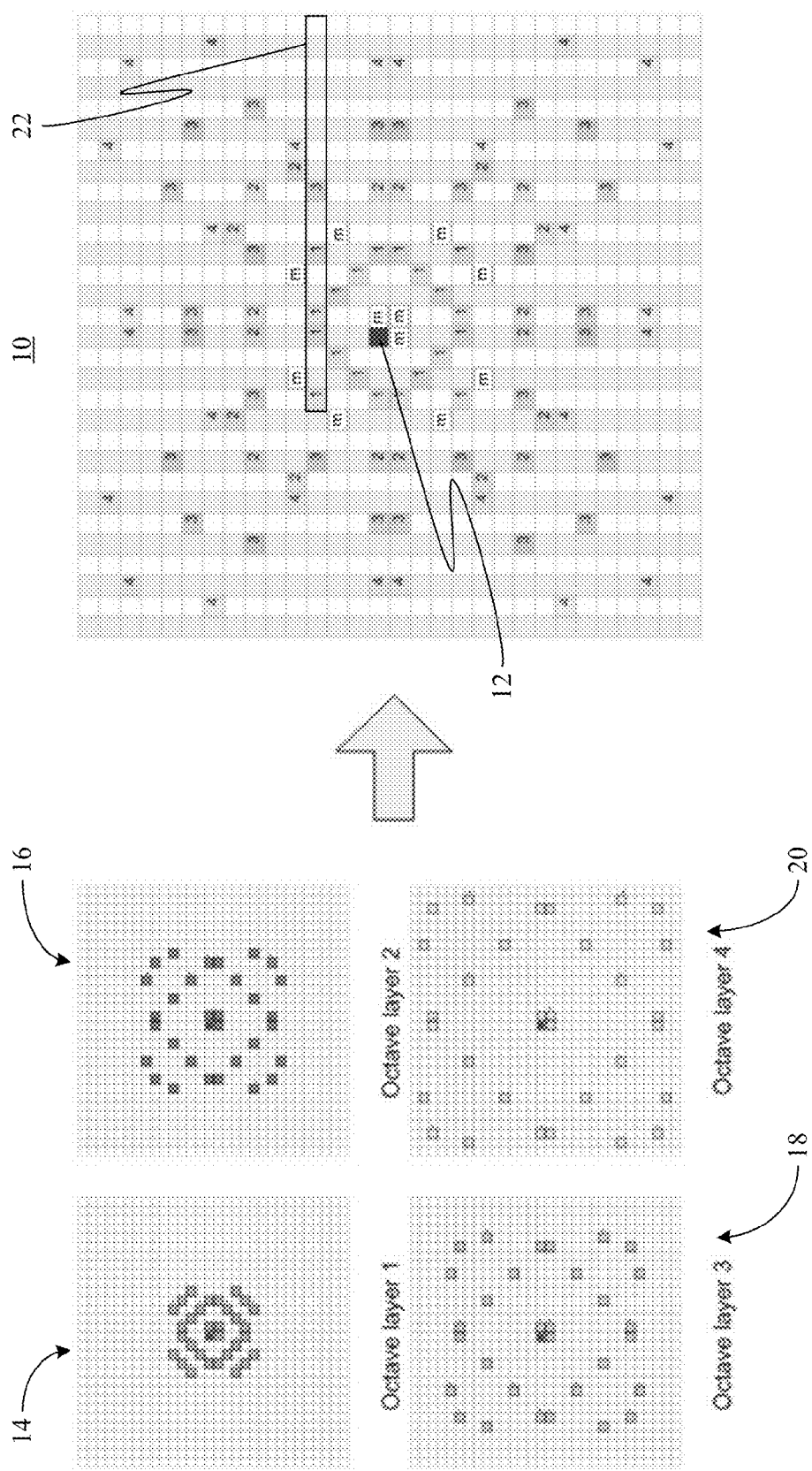
FIG. 1 is an octave diagram of an example of an image pixel map according to an embodiment.

Turning now to FIG. 1, a pixel map 10 for a portion of an image is shown, wherein multiple octave layers may be used to determine the contrast between a particular point of interest 12 near the center of the map 10 and other pixels in the map 10. As will be discussed in greater detail, octave layers can effectively provide for filtering an image with gradually larger masks, taking into account the discrete nature of integral images and the specific structure of the filters being applied to the image. In particular, pixels labeled with a "1" in the map 10 can correspond to a first octave layer map 14, pixels labeled with a "2" in the map 10 may correspond to a second octave layer map 16, pixels labeled with a "3" in the map 10 can correspond to a third octave layer map 18, and pixels labeled with a "4" in the map 10 could correspond to a fourth octave layer map 20, wherein pixels labeled with an "m" may correspond to multiple octave layers, and a greater or lesser number of layers may be used. As will also be discussed in greater detail, a Hessian matrix computation can be determined for the plurality of octave layers in parallel, wherein the Hessian matrix computations may be used to match the query image with another image.

In general, Hessian matrices may be used for interest point detection in images. For example, given a point x=(x,y) in an image I, the Hessian matrix H(x,σ) in x at scale σ can be defined as follows, $$H(x, \sigma) = \begin{bmatrix} L_{xx}(x, \sigma) & L_{xy}(x, \sigma) \\ L_{xy}(x, \sigma) & L_{yy}(x, \sigma) \end{bmatrix} \quad (1)$$

where $L_{xx}(x, \sigma)$, $L_{xy}(x, \sigma)$ and $L_{yy}(x, \sigma)$ may be Gaussian second order derivatives. According to SURF, the second order derivatives can be approximated based on "box filters" denoted as $D_{yy}$, $D_{xx}$, and $D_{xy}$. The Hessian determinant may therefore be computed from the box filters as follows, $$\det(H_{approx}) = D_{xx}D_{yy} - (0.9D_{xy})^2 \quad (2)$$

Figure 2:
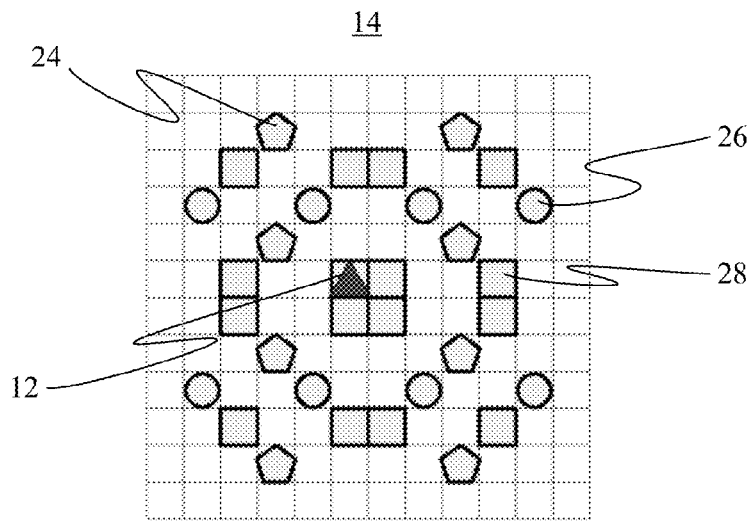
FIG. 2 is an image pixel map diagram of an example of a first octave layer according to an embodiment.

FIG. 2 shows an enlarged view of the first octave layer map 14. In the illustrated example, hexagons 24 represent box filter values that approximate the Gaussian second order derivative in the y-direction ($D_{yy}$), circles 26 represent box filter values that approximate the Gaussian second order derivative in the x-direction ($D_{xx}$), and squares 28 represent box filter values that approximate the Gaussian second order derivative in the xy-direction ($D_{xy}$). The result of a box filter can be the sum of its corresponding coefficient-weighted pixel values, wherein the coefficient applied to each pixel value can take on a number of values (e.g., −3, −1, 1, or 3). Thus, data from thirty-two surrounding pixels (eight each for $D_{xx}$ and $D_{yy}$, and sixteen for $D_{xy}$) may be used to determine a Hessian matrix computation for a particular point of interest 12, wherein the locations of the surrounding pixels can be dependent upon the octave level being used.

As the octave and octave layer becomes larger, the shape of the box filter pixel maps 14, 16, 18, 20 (FIG. 1) might not change, but the size can increase and have wider scattered pixel locations. For example, for octave i, the box filters belonging to neighboring Hessian matrix entries could have an interval of $2^i$ pixels in both the vertical and horizontal direction. After calculating the Hessian matrix at different scale factors (different octaves, and various filter sizes in each octave), interest points can be chosen by computing the local maxima (e.g., in a 3×3×3 neighborhood) in scale and image space, wherein the interest points may be compared to known interest point data for predetermined images to effectively identify the query image.

Figure 3:
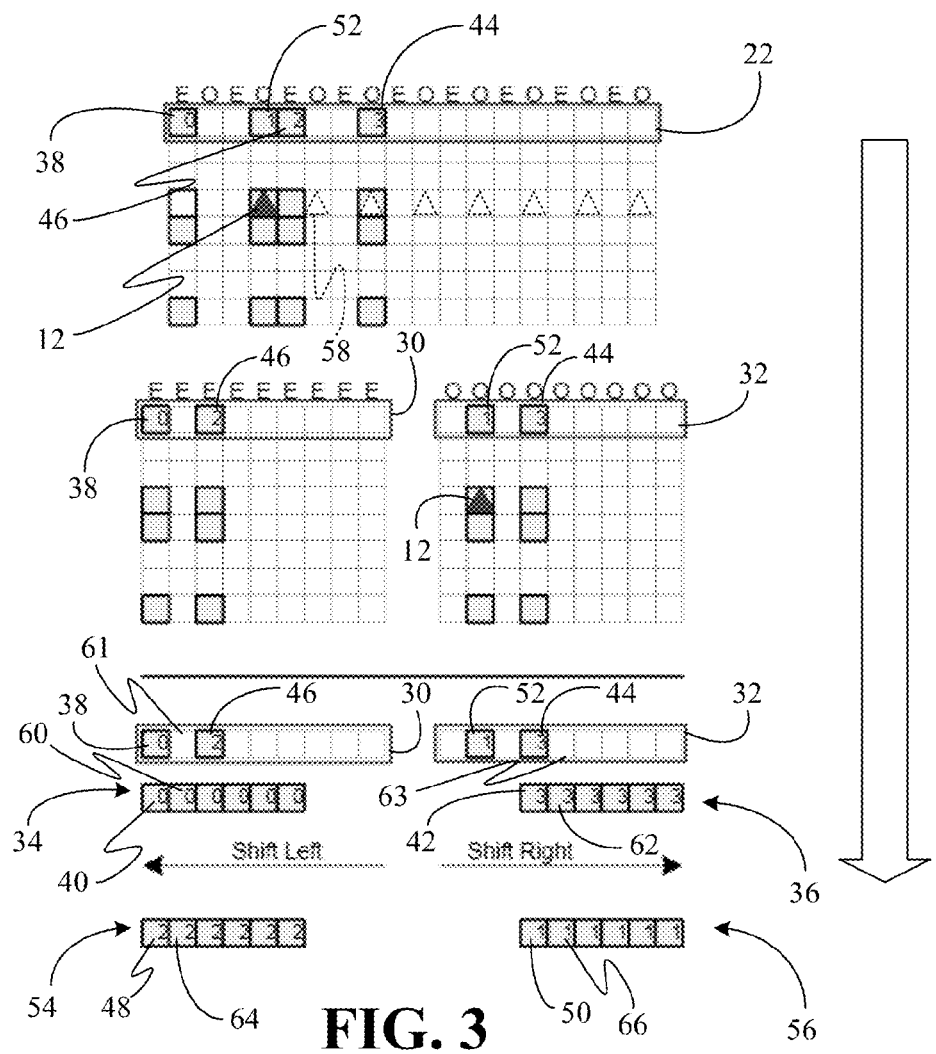
FIG. 3 is a block diagram of an example of a scheme of conducting a Hessian matrix computation according to an embodiment.

Turning now to FIG. 3, an image vector 22 is shown for a query image. In the illustrated example, the image vector 22 represents a portion of a line/row of pixels (e.g., pixels having the same x-coordinate) in the query image, wherein the particular image vector 22 shown includes four pixels (labeled one through four) that are used for the $D_{xy}$ box filter. The image vector 22 may be partitioned into a first partial image vector 30 containing the even pixels of the image vector 22, and a second partial image vector 32 containing the odd pixels of the image vector 22. In the illustrated example, a first intermediate computation 34 is determined based on the even pixels of the image vector 22, and a second intermediate computation 36 is determined based on the odd pixels of the image vector 22. In particular, a box filter value 40 can be calculated for an even pixel 38 by multiplying the value of the pixel 38 by the appropriate coefficient for the box filter in question (e.g., $D_{xy}$ in the example shown). In parallel, a box filter value 42 can be calculated for an odd pixel 44 by multiplying the value of the pixel 44 by the appropriate coefficient for the box filter in question. The intermediate computations may be stored to separate buffers, as will be discussed in greater detail.

The partial image vectors 30, 32 may then be shifted by a fixed number of pixel positions to obtain the next pixel for the intermediate computations. In particular, the illustrated first partial image vector 30 is shifted to the left by two positions, and the illustrated second partial image vector 32 is shifted to the right by two positions. The concurrent shift operations enable another box filter value 48 to be calculated for an even pixel 46 in the first partial image vector 30 based on a predetermined coefficient, and a box filter value 50 to be calculated for an odd pixel 52 in the second partial image vector 32 based on a predetermined coefficient. The illustrated box filter value 50 is calculated in parallel with the box filter value 48, and the resulting intermediate computation 54 from the even partial image vector 30 may be summed with the intermediate computation 34 and stored to an accumulation buffer dedicated to even pixels. Additionally, an intermediate computation 56 from the odd partial image vector 32 can be summed with the intermediate computation 36 and stored to an accumulation buffer dedicated to odd pixels. Moreover, the intermediate computations 34, 36, 54, 56 may be combined, along with the remaining intermediate computations for the box filter in question, into a Hessian matrix computation, which can be used to match the underlying query image to another image. Partitioning the image vector 22 on an even/odd basis can reduce the complexity of the shift logic and may lead to significant increases in computation efficiency.

The illustrated approach also determines the Hessian matrix computation for a plurality of interest points in parallel. In particular, another interest point 58 might use pixel data from the image vector 22 that is two positions to the left of the pixel data used for the interest point 12. In such a case, the first intermediate computation 34 for the even pixels could also include the box filter calculation 60 for another even pixel 61 (as well as the box filter calculations for other even pixels), and the second intermediate computation 36 for the odd pixels may include the box filter calculation 62 for another odd pixel 63 (as well as the box filter calculations for other odd pixels). Similarly, the intermediate computation 54 for the even pixels can include the box filter calculation 64 for another even pixel (as well as the box filter calculations for other even pixels), and the intermediate computation 56 for the odd pixels could include the box filter calculation 66 for another odd pixel (as well as the box filter calculations for other odd pixels).

Figure 4:
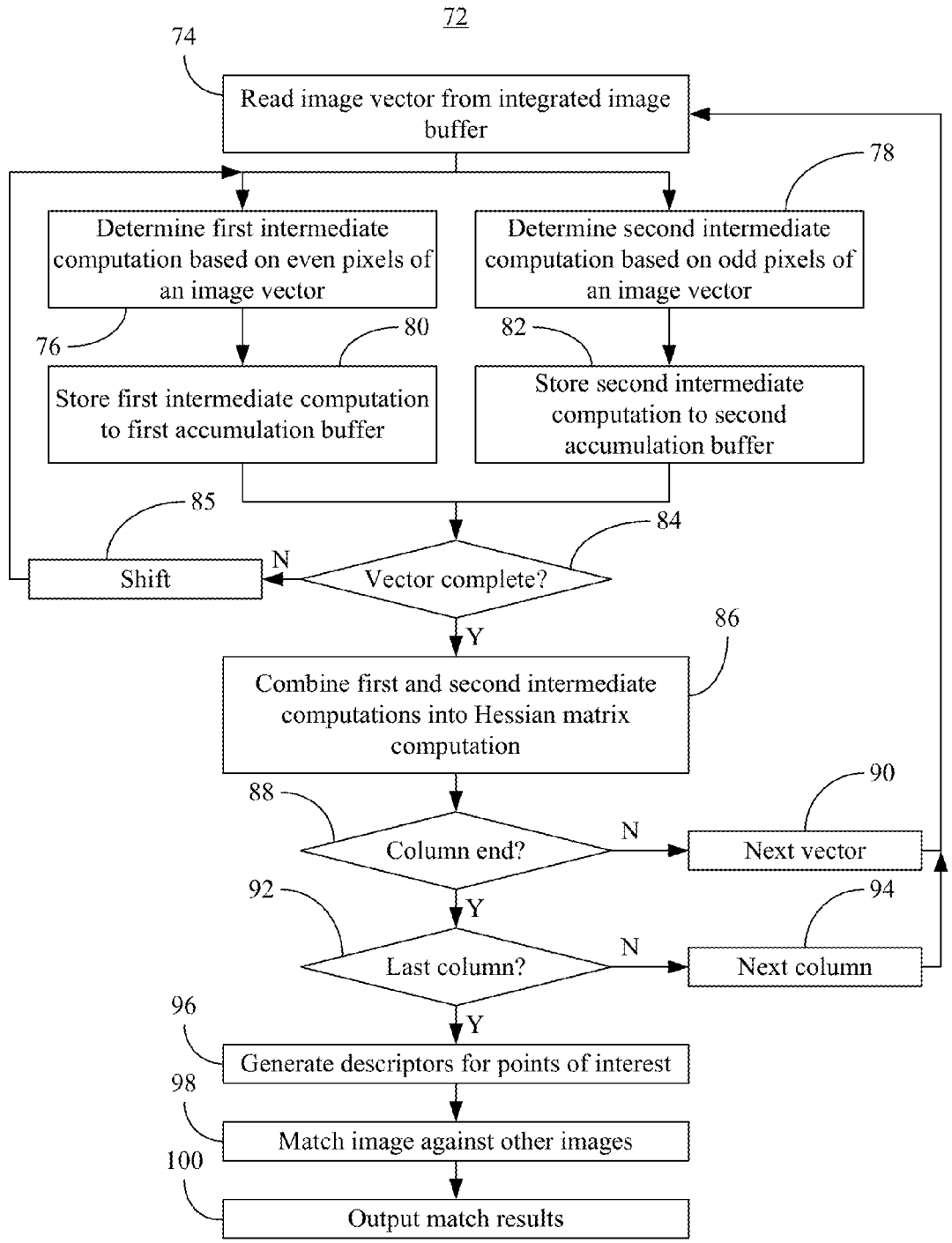
FIG. 4 is a flowchart of an example of a method of recognizing images according to an embodiment.

FIG. 4 shows a method 72 of recognizing images. Portions or all of the method 72 may be implemented as a computation pipeline in fixed-functionality hardware using circuit technology such as application specific integrated circuit (ASIC), complementary metal oxide semiconductor (CMOS) or transistor-transistor logic (TTL) technology. Illustrated processing block 74 provides for reading an image vector from an on-chip integrated image buffer. A first intermediate computation may be determined at block 76 based on even pixels of the image vector. Concurrently with the determination at block 76, illustrated block 78 provides for determining a second intermediate computation based on odd pixels of the image vector. As already noted, the determinations at blocks 76 and 78 can involve calculating box filter values by multiplying pixel values by coefficients. Moreover, the determinations at blocks 76 and 78 may be made for a plurality of interest points in parallel. The first intermediate computation may be stored to a first accumulation buffer at block 80 and the second intermediate computation may be stored to a second accumulation buffer at block 82. The storage function might involve summing a previous intermediate computation with a current intermediate computation. If it is determined at block 84 that the current image vector contains additional pixels for box filter calculations, the vectors can be shifted at block 85 and the intermediate computations may be repeated. Otherwise, illustrated block 86 provides for combining the first and second intermediate computations into a Hessian matrix computation. The combination at block 86 might be conducted by summing the intermediate computations together. As already noted, the Hessian matrix computation can be determined for a plurality of octave layers in parallel.

Illustrated block 88 provides for determining whether the end of the current column has been reached. If not, the next image vector may be selected at block 90, and the Hessian matrix computation can be continued. If the end of a column has been reached, block 92 may determine whether the last column has been reached. If not, the next column can be selected at block 94 and the Hessian matrix computation can be continued. If the last column has been reached, block 96 provides for identifying local maxima points of interest and generating descriptors for the points of interest based on the Hessian matrix computations, and block 98 provides for matching the query image against other images. The match results may be output at block 100 in the form of, for example, an overlay on top of the query image identifying data about the matching image (e.g., Eiffel Tower).

Figure 5:
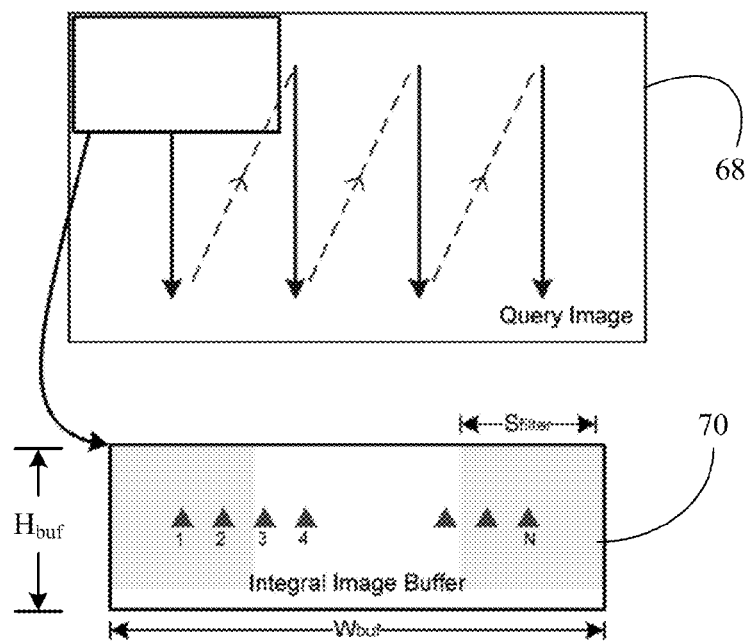
FIG. 5 is a block diagram of an example of a scheme of processing a query image according to an embodiment.

FIG. 5 shows a query image 68 processing scheme in which an integral image buffer 70 is populated with image vectors from the query image on a column-by-column basis. In particular, there may be a tradeoff between the size of the on-chip integral image buffer 70 and its filling bandwidth. Accordingly, a buffer management scheme may be formulated so as to minimize the on-chip buffer size requirements with a relatively small extra filling bandwidth overhead versus an ideal case. The width $W_{buf}$ and height $H_{buf}$ (in pixels) of the integral image buffer 70 can be expressed as, $$W_{buf} = 2(N-1) + S_{filter} \quad (3)$$

$$H_{buf} = S_{filter} + 2 \quad (4)$$

where N is the number of Hessian matrix entries to be computed in parallel and $S_{filter}$ is the maximum supported block filter size. As already noted, the Hessian matrix may be computed on a column-by-column basis, wherein a column can include N Hessian matrix entries. Thus, to start with a column, $W_{buf}*S_{filter}$ integral image pixels may be fetched into the integral image buffer 70 as an image vector 22 (FIG. 3). During the Hessian matrix computation based on the fetched image vector, an additional two vectors can be fetched and filled into the integral image buffer 70 so that upon completion of the processing of the current image vector, processing may continue directly with the next vector. Accordingly, the total filling and ideal bandwidths might be expressed as, $$B_{fil} = B_{ideal} * \left( \frac{(2(N-1) + S_{filter})}{(2N)} \right) \quad (5)$$

$$B_{ideal} = Q_h * Q_w * F_{rate} \quad (6)$$

where $Q_h$ is the query image height, $Q_w$ is the query image width, and $F_{rate}$ is the supported frame rate. For example, for a 640×480 video stream having one byte per pixel at thirty frames per second, N=32 and $S_{filter}$=30 (six octave layers), the total on-chip buffer filling bandwidth might be 14 MB/s and 1.6× of $B_{ideal}$. Such an approach would involve a buffer size of 4K integral image pixels and can be independent of video resolution.

Figure 6:
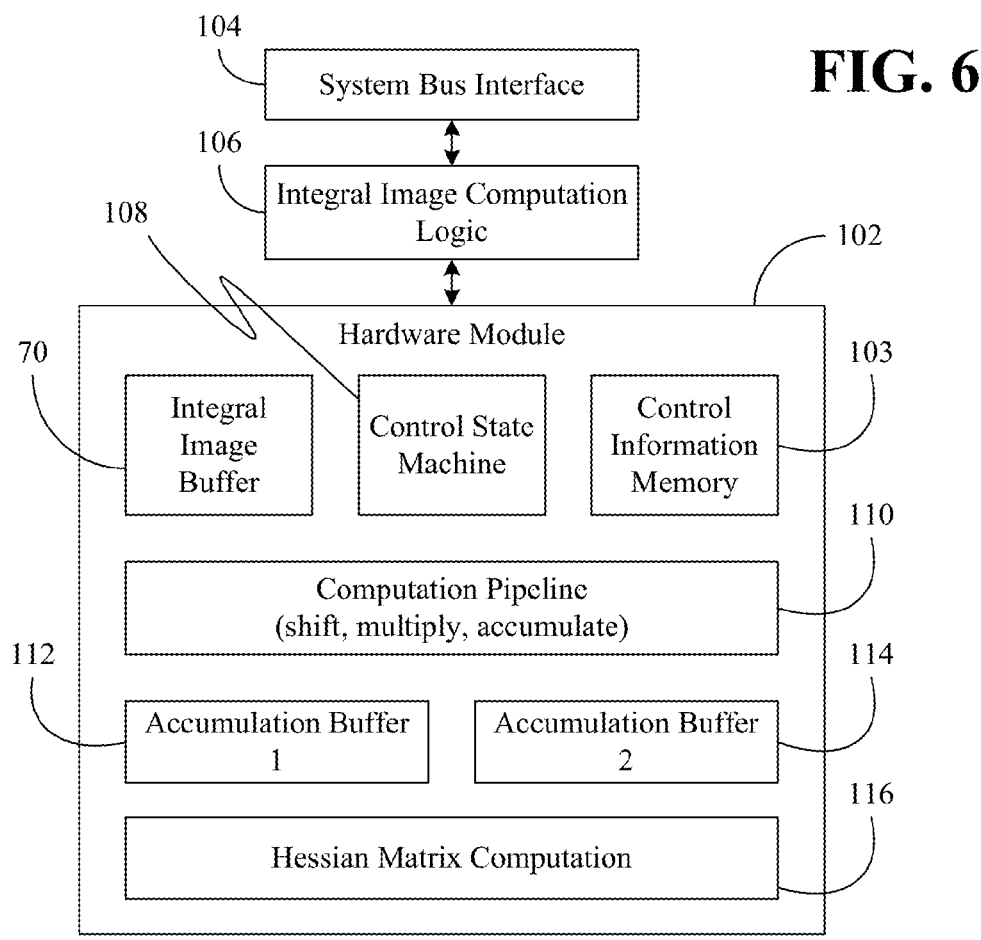
FIG. 6 is a block diagram of an example of a hardware module according to an embodiment.

Turning now to FIG. 6, a hardware module 102 is shown in which integral image computation logic 106 retrieves image vectors from off-chip memory (not shown) via a system bus interface 104 and provides the image vectors to the hardware module 102 for storage in an integral image buffer 70 and real time processing. The illustrated hardware module 102 includes logic such as a control state machine 108 and a computation pipeline 110 to determine intermediate computations based on even pixels of the image vectors, determine intermediate computations based on odd pixels of the image vectors, and store the intermediate computations to separate accumulation buffers 112, 114, wherein the first accumulation buffer 112 is dedicated to intermediate computations for even pixels, and the second accumulation buffer 114 is dedicated to intermediate computations for odd pixels.

As already noted, the intermediate computations can be determined in parallel. Hessian matrix computation logic 116 can combine the intermediate computations into Hessian matrix entries, wherein the Hessian matrix computations may be determined for a plurality of interest points in parallel. In addition, the Hessian matrix computations can be determined for a plurality of octave layers in parallel, which may enable decreased off-chip memory size/requirements, reduce on-chip integral image buffer access bandwidth, and improve Hessian matrix computation performance. The hardware module 102 may also include control information memory 103 to store information such as octave layer configuration data (e.g., 128 entries for four octave layers), box filter coefficient data and other control data.

Figure 7:
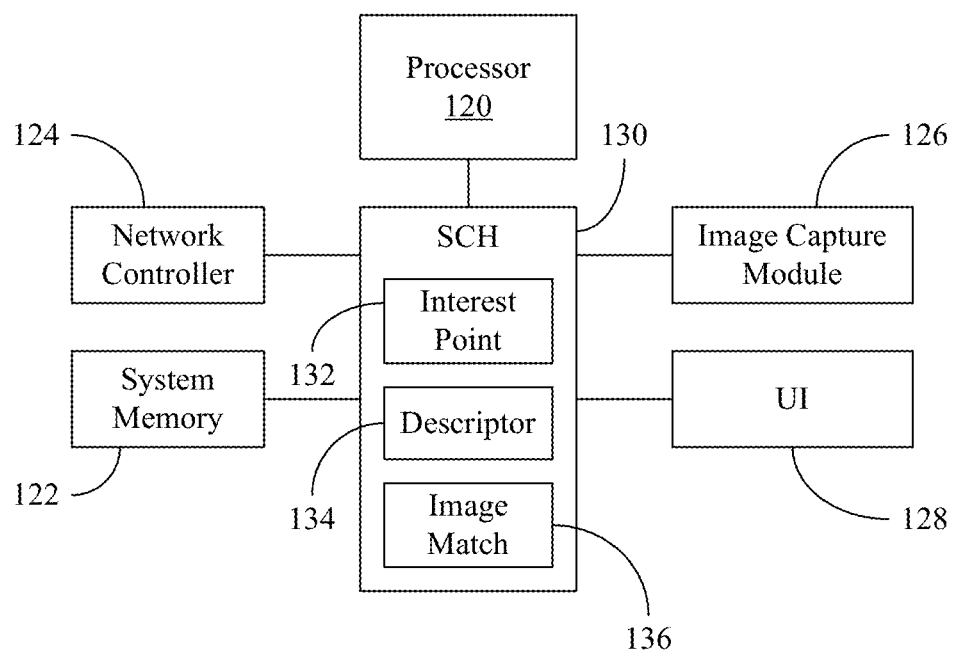
FIG. 7 is a block diagram of an example of a system according to an embodiment.

Turning now to FIG. 7, a platform 118 having a processor 120, system memory 122, a network controller 124, an image capture module 126, and UI (user interface) components such as a display, keypad, touch screen, microphone, speaker, etc. in order to allow a user to interact with and perceive information from the platform 118. The platform 118 could be part of a mobile platform such as a laptop, mobile Internet device (MID), personal digital assistant (PDA), wireless smart phone, media player, imaging device, etc., or any combination thereof. The platform 118 might also be part of a fixed platform such as a personal computer (PC), server, workstation, etc. Thus, the processor 120 could include one or more processor cores (not shown), wherein the cores of the processor may execute an operating system (OS) such as a Microsoft Windows, Linux, or Mac (Macintosh) OS, and various other software applications. Each core may be fully functional with instruction fetch units, instruction decoders, level one (L1) cache, execution units, and so on. The system memory 122 could include dynamic random access memory (DRAM) configured as a memory module such as a dual inline memory module (DIMM), a small outline DIMM (SODIMM), etc.

The illustrated network controller 124 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The illustrated platform 118 also includes a system controller hub (SCH) 130 that interconnects the processor 120 with the other components of the system. For example, the SCH 130 might communicate with the system memory 122 over a system bus interface 104 (FIG. 6) to obtain image vectors from images/video stored in the system memory 122. Additionally, the SCH 130 could obtain image vectors from an off-platform source via the network controller 124, or from an on-platform image capture module 126. The illustrated SCH 130 includes interest point hardware logic 132 to, for a plurality of vectors in a query image, determine a first intermediate computation based on even pixels of an image vector, determine a second intermediate computation based on odd pixels of the image vector, and combine the first and second intermediate computations into a Hessian matrix computation, as already discussed. Descriptor logic 134 may generate descriptors for local maxima points of interest in the image, and match determination logic 136 can match the query image to another image based at least in part on the Hessian matrix computation. The results of the match may be output to the user via the UI 128.

Thus, the approaches described herein can provide hardware-accelerated Mobile Augmented Reality (MAR) solutions that have substantial power and performance advantages over conventional approaches. Indeed, real time image recognition may be obtained at reasonable processing speeds and relatively high video frame rates.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   determining a first intermediate computation based only on even pixels in one coordinate of an image vector associated with a first image;
   storing the first intermediate computation to a first accumulation buffer;
   determining a second intermediate computation based only on odd pixels in the one coordinate of the image vector;
   storing the second intermediate computation to a second accumulation buffer;
   combining the first and second intermediate computations into a Hessian matrix computation, wherein the first and second intermediate computations are determined in parallel, and the Hessian matrix computation is determined for a plurality of interest points in parallel; and
   matching the first image to a second image based at least in part on the Hessian matrix computations, wherein determining each intermediate computation further includes:
   partitioning the image vector including pixels in the one coordinate into a plurality of partial image vectors, wherein each of the plurality of image vectors includes only even pixels or only odd pixels;
   calculating a box filter value for a first pixel in a partial image vector of the plurality of image vectors including only the even pixels or only the odd pixels;
   shifting the partial image vector by a fixed number of pixel positions, wherein the size of the partial image vector remains the same;
   calculating a box filter value for a second pixel in the partial vector; and
   summing the box filter value for the first pixel and the box filter value for the second pixel.

2. The method of claim 1, further including:
   calculating a first box filter value for a first even pixel in a first partial image vector of the plurality of partial image vectors including only the even pixels by multiplying a value for the first even pixel by a predetermined coefficient; and
   calculating a first box filter value for a first odd pixel in a second partial image vector of the plurality of partial image vectors including only the odd pixels by multiplying a value for the first odd pixel by a predetermined coefficient.

3. The method of claim 1, wherein each box filter value includes an approximation of a Gaussian second order derivative in at least one of an x-direction, a y-direction and an xy-direction.

4. The method of claim 1, wherein the Hessian matrix computation is determined for a plurality of octave layers in parallel.

5. An apparatus comprising:
a hardware module including logic to, for a plurality of vectors in an image,
determine a first intermediate computation based only on even pixels in one coordinate of an image vector,
determine a second intermediate computation based only on odd pixels in the one coordinate of the image vector, and
combine the first and second intermediate computations into a Hessian matrix computation, wherein, for each intermediate computation, the logic is further to,
partition the image vector including pixels in the one coordinate into a plurality of partial image vectors, wherein each of the plurality of image vectors includes only even pixels or only odd pixels,
calculate a box filter value for a first pixel in a partial image vector of the plurality of image vectors including only the even pixels or only the odd pixels,
shift the partial image vector by a fixed number of pixel positions, wherein the size of the partial image vector remains the same,
calculate a box filter value for a second pixel in the partial vector, and
sum the box filter value for the first pixel and the box filter value for the second pixel.

6. The apparatus of claim 5, wherein the first and second intermediate computations are to be determined in parallel.

7. The apparatus of claim 5, wherein the logic is to,
calculate a first box filter value for a first even pixel in a first partial image vector of the plurality of partial image vectors including only the even by multiplying a value for the first even pixel by a predetermined coefficient, and
calculate a first box filter value for a first odd pixel in a second partial image vector of the plurality of partial image vectors including only the odd pixels by multiplying a value for the first odd pixel by a predetermined coefficient.

8. The apparatus of claim 5, wherein each box filter value is to include an approximation of a Gaussian second order derivative in at least one of an x-direction, a y-direction, and an xy-direction.

9. The apparatus of claim 5, wherein the fixed number of positions is two positions.

10. The apparatus of claim 5, wherein the logic is to further,
retrieve the image vector from an integral image buffer,
store the first intermediate computation to a first accumulation buffer, and
store the second intermediate computation to a second accumulation buffer.

11. The apparatus of claim 5, wherein the logic is to determine the Hessian matrix computation for a plurality of interest points in the image in parallel.

12. The apparatus of claim 5, wherein the logic is to determine the Hessian matrix computation for a plurality of octave layers in parallel.

13. A system comprising:
an image capture module to capture a first image;
a hardware module including logic to, for a plurality of vectors in the first image,
determine a first intermediate computation based only on even pixels in one coordinate of an image vector,
determine a second intermediate computation based only on odd pixels in the one coordinate of the image vector, and
combine the first and second intermediate computations into a Hessian matrix computation; and
a match determination module to match the first image to a second image based at least in part on the Hessian matrix computation, wherein, for each intermediate computation, the logic is further to,
partition the image vector including pixels in the one coordinate into a plurality of partial image vectors, wherein each of the plurality of image vectors includes only even pixels or only odd pixels,
calculate a box filter value for a first pixel in a partial image vector of the plurality of image vectors including only the even pixels or only the odd pixels,
shift the partial image vector by a fixed number of pixel positions, wherein the size of the partial image vector remains the same,
calculate a box filter value for a second pixel in the partial vector, and
sum the box filter value for the first pixel and the box filter value for the second pixel.

14. The system of claim 13, wherein the first and second intermediate computations are to be determined in parallel.

15. The system of claim 13, wherein each box filter value is to include an approximation of a Gaussian second order derivative in at least one of an x-direction, a y-direction and an xy-direction.

16. The system of claim 13, wherein the logic is to further,
retrieve the image vector from an integral image buffer,
store the first intermediate computation to a first accumulation buffer, and
store the second intermediate computation to a second accumulation buffer.

17. The system of claim 13, wherein the logic is to determine the Hessian matrix computation for a plurality of interest points in the image in parallel.

18. The system of claim 13, wherein the logic is to determine the Hessian matrix computation for a plurality of octave layers in parallel.

19. The system of claim 13, wherein the logic is to,
calculate a first box filter value for a first even pixel in a first partial image vector of the plurality of partial image vectors including only the even by multiplying a value for the first even pixel by a predetermined coefficient, and
calculate a first box filter value for a first odd pixel in a second partial image vector of the plurality of partial image vectors including only the odd pixels by multiplying a value for the first odd pixel by a predetermined coefficient.

* * * * *

UNITED STATES PATENT AND TRADEMARK OFFICE
CERTIFICATE OF CORRECTION

PATENT NO. : 8,781,234 B2
APPLICATION NO. : 12/896077
DATED : July 15, 2014
INVENTOR(S) : Yong Zhang et al.

Page 1 of 1

It is certified that error appears in the above-identified patent and that said Letters Patent is hereby corrected as shown below:

In the Claims

Column 9, line 33, in claim 7, after "even;" insert -- pixels; --.

Column 10, line 50, in claim 19, after "even;" insert -- pixels; --.

Signed and Sealed this
Twenty-first Day of October, 2014

Michelle K. Lee
*Deputy Director of the United States Patent and Trademark Office*